(12) United States Patent
Stanton et al.

(10) Patent No.: US 12,516,691 B2
(45) Date of Patent: Jan. 6, 2026

(54) FASTENING SYSTEM WITH EDGEMOUNT INSERT

(71) Applicant: Textron Aviation Inc., Wichita, KS (US)

(72) Inventors: Patrick Allen Stanton, Rose Hill, KS (US); Brian Keith Jacobs, Wichita, KS (US)

(73) Assignee: Textron Innovations Inc., Providence, RI (US)

( * ) Notice: Subject to any disclaimer, the term of this patent is extended or adjusted under 35 U.S.C. 154(b) by 897 days.

(21) Appl. No.: 17/824,618

(22) Filed: May 25, 2022

(65) Prior Publication Data

US 2022/0381276 A1    Dec. 1, 2022

Related U.S. Application Data

(60) Provisional application No. 63/192,600, filed on May 25, 2021.

(51) Int. Cl.
*F16B 5/02*          (2006.01)
*F16B 11/00*       (2006.01)
*F16B 12/20*       (2006.01)

(52) U.S. Cl.
CPC .......... *F16B 12/20* (2013.01); *F16B 5/0208* (2013.01); *F16B 11/006* (2013.01)

(58) Field of Classification Search
CPC ........ F16B 5/01; F16B 5/0205; F16B 5/0614; F16B 11/006; F16B 12/12; F16B 12/14; F16B 12/20; F16B 12/2009; F16B 12/2054; F16B 12/2063; F16B 12/26; F16B 2012/106; F16B 2012/043; F16B 2012/145; F16B 2200/10; Y10S 403/11; Y10S 403/12; Y10S 403/13; Y10T 403/14; Y10T 403/142; Y10T 403/145; Y10T 403/47; Y10T 403/473
See application file for complete search history.

(56) References Cited

U.S. PATENT DOCUMENTS

| | | |
|---|---|---|
| 3,279,830 A | 10/1966 | Albert |
| 4,178,047 A | 12/1979 | Welch |
| 4,236,848 A | 12/1980 | Rock et al. |
| 4,296,580 A | 10/1981 | Weinar |
| 4,353,663 A | 10/1982 | Glickman |
| 4,357,119 A | 11/1982 | Pollitt |
| 4,752,150 A | 6/1988 | Salice |
| 4,984,926 A | 1/1991 | Harley |
| 5,096,324 A | 3/1992 | Harley |

(Continued)

FOREIGN PATENT DOCUMENTS

| | | |
|---|---|---|
| AT | 357290 B | 11/1979 |
| DE | 2225348 A1 | 12/1973 |

(Continued)

*Primary Examiner* — Amber R Anderson
*Assistant Examiner* — Zachary A Hall
(74) *Attorney, Agent, or Firm* — Avek IP, LLC

(57) ABSTRACT

Disclosed is a system for connecting an edge of one panel to an edge of a second panel. Recesses are formed into the edges of each panel, and two distinct inserts are pressed into and held within the recesses. The inserts include holes for receiving epoxy, and epoxy conducting shafts and circuits are formed on the outside of the inserts to assist in the encapsulation of the insert within each panel edge.

20 Claims, 15 Drawing Sheets

(56) References Cited

U.S. PATENT DOCUMENTS

| | | | |
|---|---|---|---|
| 5,632,582 A * | 5/1997 | Gauron | F16B 5/01 |
| | | | 411/258 |
| 5,762,442 A * | 6/1998 | Salice | F16B 12/16 |
| | | | 403/231 |
| 6,652,208 B2 | 11/2003 | Gillis | |
| 8,562,239 B1 | 10/2013 | Liu et al. | |
| D711,727 S | 8/2014 | Sauer | |
| 9,080,586 B2 * | 7/2015 | Liu | F16B 12/14 |
| 9,109,615 B2 * | 8/2015 | Cuddy | F16B 5/01 |
| 9,457,540 B2 | 10/2016 | Lewis et al. | |
| 9,803,668 B2 | 10/2017 | Reeves et al. | |
| 10,161,432 B2 | 12/2018 | Nitschmann | |
| 10,309,098 B2 * | 6/2019 | Chadwell | E04C 2/365 |
| 2007/0110511 A1 | 5/2007 | Chen | |
| 2018/0347608 A1 | 12/2018 | Haser et al. | |
| 2021/0003159 A1 | 1/2021 | Thomson | |

FOREIGN PATENT DOCUMENTS

| | | | | |
|---|---|---|---|---|
| DE | 102019118517 A1 | | 5/2020 | |
| EP | 1820977 A1 | | 8/2007 | |
| FR | 2446946 A1 | | 8/1980 | |
| GB | 2004615 A | * | 4/1979 | .......... F16B 12/2063 |
| WO | WO-2010060987 A1 | * | 6/2010 | ............ F16B 5/0084 |
| WO | 2012089021 A1 | | 7/2012 | |

\* cited by examiner

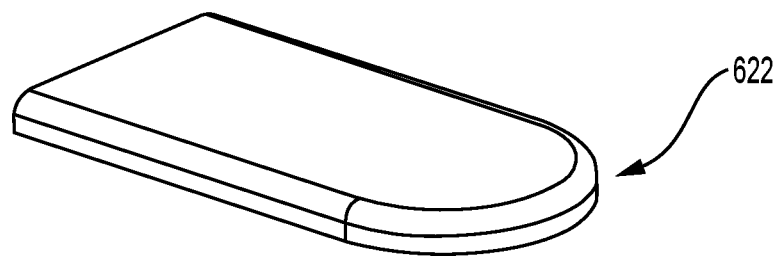
FIG. 6B
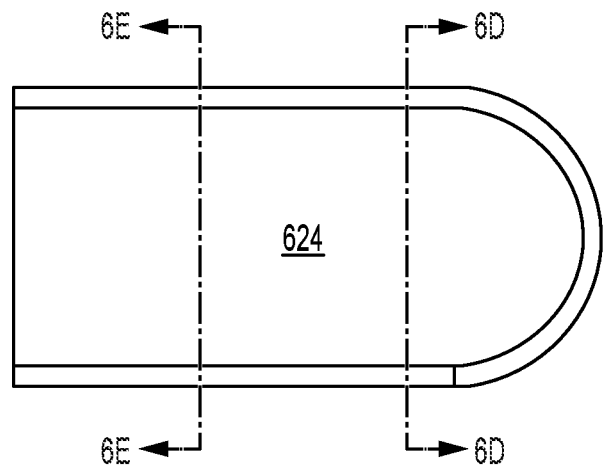
FIG. 6C
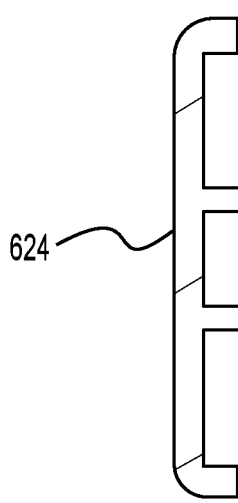      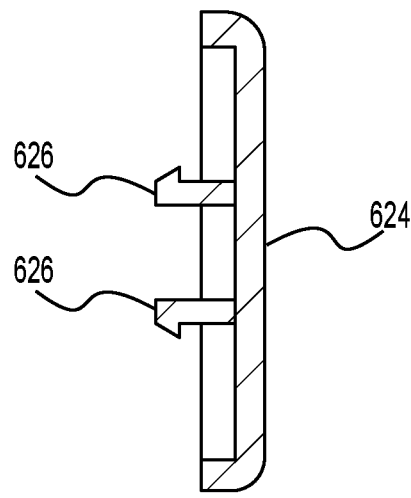
FIG. 6E              FIG. 6D

FASTENING SYSTEM WITH EDGEMOUNT INSERT

CROSS-REFERENCE TO RELATED APPLICATIONS

This application claims the benefit of U.S. Provisional Application No. 63/192,600 filed on May 25, 2021, the entire contents of which are herein incorporated by reference.

BACKGROUND OF THE INVENTION

1. Field

The disclosed embodiments relate generally to the field of fastening structures. More specifically, the disclosed embodiments relate to fastening composite panel edges to other structures.

2. Description of the Related Art

It is known to use fasteners to connect panels and other similar structures together. Some prior art devices are cylindrical inserts that are disk shaped and include a cylindrical supporting post. In some versions, an upper disk has holes that are used to receive epoxy into a cylindrical space existing between the disks. See, e.g., the conventional device shown in FIGS. 4A-D. With these sorts of devices, a fastener is received by the insert to accomplish securement.

U.S. Pat. No. 6,652,208 to Gillis discloses a fastener for attaching a panel to a substrate, in which the fastener is hidden from view. Gillis discloses that the fastener has a screw part that is designed to connect a panel to a substrate. The screw part in Gillis includes a complementary member that fits into a hexagonal socket in a base. A drive rod is inserted through a bore in the panel to drive the anchor screw into the substrate to accomplish securement.

U.S. Pat. No. 4,178,047 to Welch discloses a hidden fastener assembly that attaches furniture panels at perpendicular angles. The Welch panels are connected to the opposing panels by fasteners located in recessed pockets and fastener clips are slidably attached to a shouldered screw located on one of the panels.

U.S. Pat. No. 9,803,668 to Reeves et al. discloses a panel insert assembly which has a threaded opening. The Reeves insert includes a thread member that is inserted into the panel through an opening and keeps the insert in place.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages will be apparent from the following detailed description of the embodiments and the accompanying drawing figures.

In some aspects, the techniques described herein relate to a method for fastening an edge of a first panel an edge of a second panel, the system including: orienting and edge of the first panel at an angle to, and along an edge of a second panel; configuring a first insert to fit into and be secured inside a first recess defined into the edge of the first panel and to have a fastener receptacle installed in the second insert, the receptacle having a center axis that is substantially perpendicular to the first panel; and configuring a second insert to fit into and be secured inside a second recess defined into the edge of the second panel, the second insert being configured to contain a fastener which is securable within the second insert while being driven into the receptacle in the first insert.

In some aspects, the techniques described herein relate to the method including: securing the first and second inserts into the first and second recesses using epoxy.

In some aspects, the techniques described herein relate to a method, including: forming one or more apertures into a top portion of the first insert to receive epoxy into a space defined around a plurality of outside surfaces of the first insert to encapsulate a base of the first insert.

In some aspects, the techniques described herein relate to a method, including: forming one or more apertures into a top portion of the second insert to receive epoxy into a space defined around a plurality of outside surfaces of the second insert to encapsulate a base of the second insert.

In some aspects, the techniques described herein relate to a method including: creating an elongated aperture into a top portion of the second insert, the elongated aperture having a widened portion configured to allow passage of a fastener head into the inside of the second insert for installation.

In some aspects, the techniques described herein relate to a system for connecting a first structure to a second structure, the system including: an insert configured to be received and secured into a recess formed into an edge of the first structure; the insert including a first face configured to be substantially consonant with a first surface on the first structure; the insert including a second face being in a plane that is substantially perpendicular relative to the first face, the second face being substantially consonant with a corresponding surface of an edge of the first structure; and a fastener receiving area defined into and through the first face of the insert, the fastener receiving area configured to receive a fastener used to secure the second structure to the first structure.

In some aspects, the techniques described herein relate to a system wherein the insert is configured to fit snugly in a three-dimensional volume defined by a plurality of inside surfaces of the recess.

In some aspects, the techniques described herein relate to a system wherein the fastener receiving area includes a bore sized to receive and secure an internal cylinder, the cylinder configured receive the fastener.

In some aspects, the techniques described herein relate to a system wherein the internal cylinder includes threads configured to mate with corresponding threads on the fastener.

In some aspects, the techniques described herein relate to a system wherein the first face is on a first wall that extends outwardly from the insert to form an arched flange that is configured to engage areas inside the recess near the first surface of the first structure.

In some aspects, the techniques described herein relate to a system wherein the second face of the insert is formed of a second wall that has outwardly-extending lateral flange portions configured to engage internal surfaces of the recess near the edge of the first structure.

In some aspects, the techniques described herein relate to a system wherein the arched flange and the lateral flanges define an internal space between a body of the insert and a plurality of internal surfaces of the recess when the insert is installed.

In some aspects, the techniques described herein relate to a system wherein one or more apertures exist in the first wall of the insert, each of the one or more apertures allowing epoxy to be introduced into one or more corresponding epoxy-conducting shafts, the epoxy-conducting shafts delivering epoxy to be distributed inside an internal cavity defined when the insert is installed.

In some aspects, the techniques described herein relate to a system wherein the body presents a plurality of cross channels arching over the body, the cross channels being established by crosswise grooves receiving epoxy from each of the one or more epoxy-conducting shafts.

In some aspects, the techniques described herein relate to a system wherein at least one of the first and second structures is a composite panel.

In some aspects, the techniques described herein relate to a system for fastening an edge of a first panel to an edge of a second panel, the system including: a first insert shaped to fit into and be secured inside a first recess defined into the edge of the first panel; an aperture defined in a wall of the first insert, the aperture sized to allow the passage of a shaft of a fastener, but deny passage of a head of the fastener therethrough; a second insert shaped to fit into and be secured inside a second recess defined into the edge of the second panel; and a fastener-receiving receptacle installed in the second insert, the receptacle having a center axis that is substantially perpendicular to the first panel.

In some aspects, the techniques described herein relate to a system wherein the first and second inserts are configured to receive epoxy to secure the first and second inserts into the first and second recesses, respectively.

In some aspects, the techniques described herein relate to a system wherein one or more apertures are formed into each of the first and second inserts to introduce epoxy into a confined space created inside each of the first and second inserts.

In some aspects, the techniques described herein relate to a system wherein an elongated opening is made into a top portion of the first insert, the elongated aperture having a widened portion configured to allow passage of a head of the fastener into the inside of the second insert for installation.

In some aspects, the techniques described herein relate to a system wherein the fastener-receiving receptacle installed into the second insert includes an internally threaded cylinder.

BRIEF DESCRIPTION OF THE SEVERAL VIEWS OF THE DRAWINGS

Illustrative embodiments are described in detail below with reference to the attached drawing figures, which are incorporated by reference herein and wherein:

FIGS. 6B, 6C, 6D, and 6E show a cover used with the insert shown in FIGS. 3A-E in perspective, above, one end, and in cross section at a midpoint;

Figure 1A:
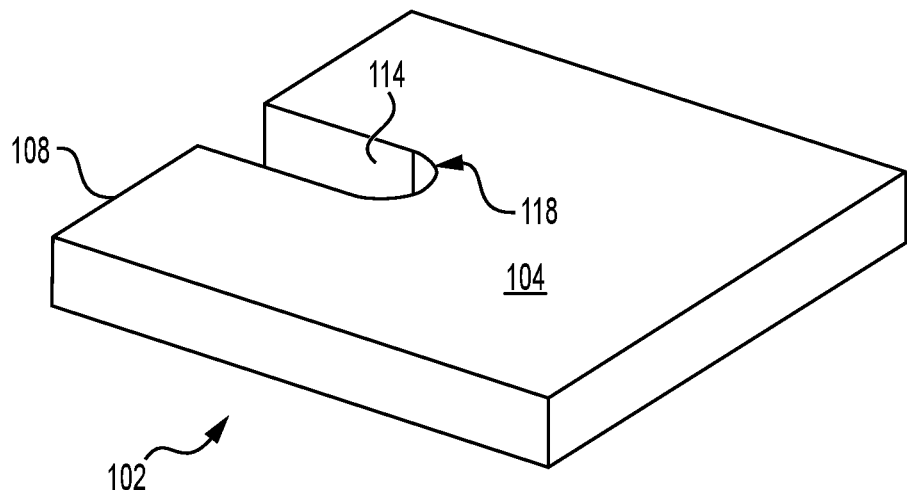
FIG. 1A is a perspective view of a panel configured to accommodate an insert.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Figure 1B:
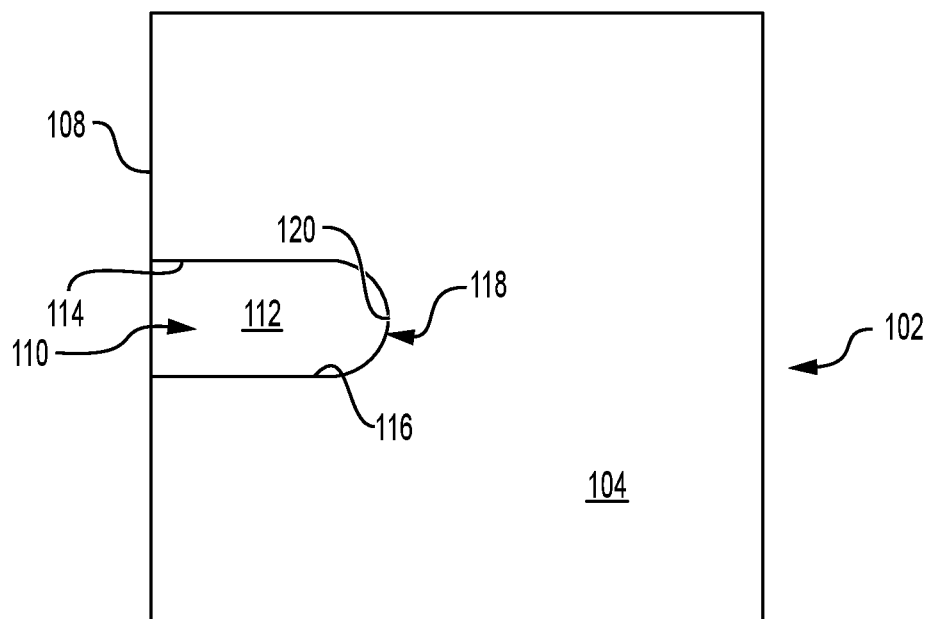
FIG. 1B is a top view of the panel of FIG. 1A.
Figure 1C:
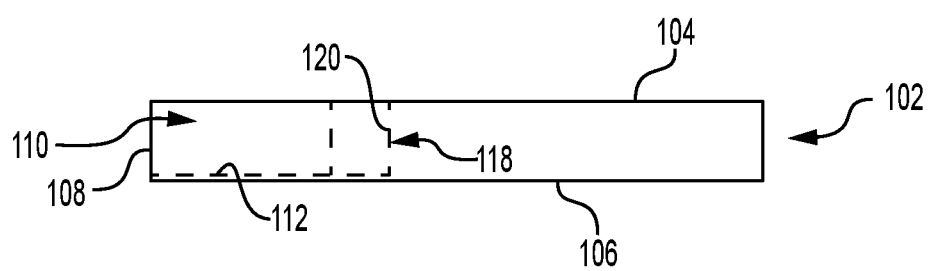
FIG. 1C is a side view of the panel shown in FIG. 1A.

Embodiments provide systems and a method for fastening items together. More specifically, systems and methods are disclosed which will result in joined panels or other structures. The joined together article will include both a first composite structure 102 shown in FIGS. 1A-1C and a second composite structure 202 shown in FIGS. 2A-C. In embodiments, the panels 102 and 202 are a composite honeycomb core structure including upper and lower skin portions, and honeycomb structures and voids internally. In the disclosed embodiment, the first composite structure 102 is configured to be attached perpendicularly to the second, upright, composite structure 202. In embodiments each of structures 102 and 202 are panels, each having a substantially consistent thickness (see side views of FIGS. 1C and 2C). It is entirely possible, however, that the systems disclosed herein could be used to affix any variety of panels or other structures, honeycomb or not. Thus, the disclosed embodiments for structures affixed should not be restricted to any particular configuration unless otherwise recited in a claim. In the disclosed embodiments, however, panels 102 and 202 have substantially planar opposing surfaces. For example, structure 102 includes an upper surface 104 and a substantially planar under surface 106. Similarly, structure 202 includes a substantially planar surface 204 to which the other structure 102 is to be connected, and an outside surface 206.

Modifications have been made into both structures 102 and 202 for the purposes of fastening one to the other. Presume a connection is intended to be made between a connection edge 108 of panel 102 to either a lower edge 208, or to an intermediate connection point 210 of the second panel 202. To make the connection, a recess 110 has been fabricated into the edge 108 of the first panel 102. This can be done using known machining tools to clean out areas of the panel, e.g., removing the top skin and internal areas leaving only a lower skin.

Recess 110 is, in embodiments, formed into the panel edge such that it has a consistent depth. In the side sectional view of FIG. 1C, it can be seen that the recess 110 comprises a floor 112 that is made to be substantially coplanar with the substantially planar upper composite surface 104. In embodiments where the panel is a composite structure having a honeycomb core, the removed material can comprise the upper skin and internal honeycomb core materials, thus leaving only a lower composite skin portion. From top view FIG. 1B, it can be seen that the recess 110 has parallel opposing side walls 114 and 116 and terminates with a rounded end 118 which creates, inside the recess 110, a semi-cylindrical end wall 120 (see FIGS. 1A and 1C).

In looking at the details, it can be seen that two independent recesses have been formed into the second panel 202. More specifically, a first edge-formed recess 210 located on lower edge 208, and a second recess 211 formed at an intermediate connection point. Each of these recesses have been configured into the panels (e.g., machined using 3D nested based manufacturing, manual machining processes, or molded, sized, etc. using numerous other techniques) such that they can, using inserted devices, enable fastening (e.g., by a screw or bolt) to hold composite or other comprised panels together. For honeycomb composite embodiments, again here, the upper skin and honeycomb middle structures can be cleaned out by machining, and only the lower composite skin left.

It should be understood that often either edge-formed, intermediate, or alternatively located recesses could be provided singly or in multiples into either panel, and that all could be positioned differently depending on the application. The locations for the two recesses 210 and 211 have been selected as exemplary only, and those skilled in the art will recognized that depending on the structure being assembled, numerous recess locations might be used.

Figure 2A:
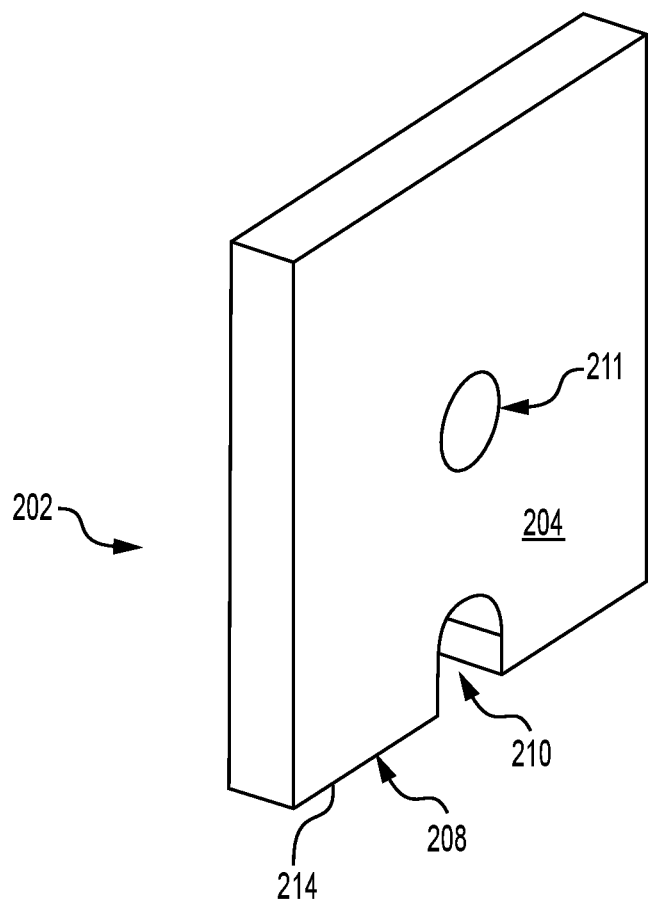
FIG. 2A is a perspective view of a panel configured to accommodate two inserts.
Figure 2B:
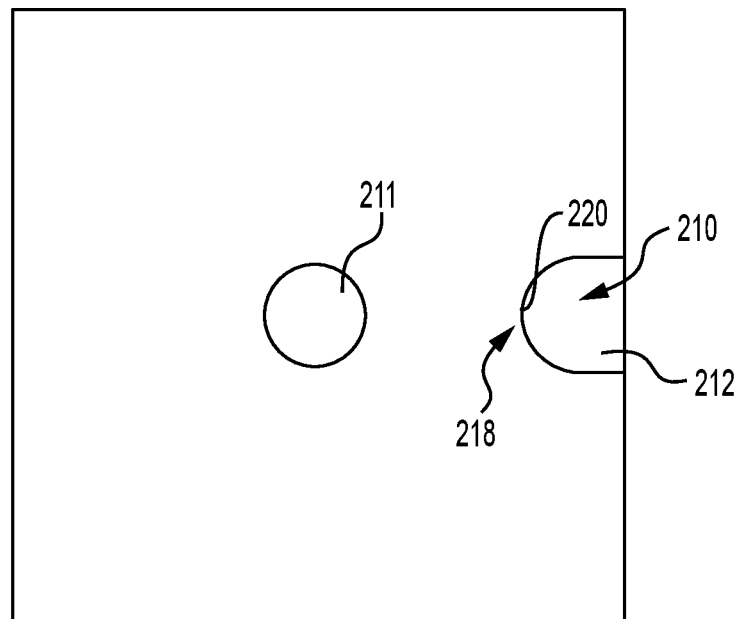
FIG. 2B is a top view of the panel of FIG. 2A.
Figure 2C:
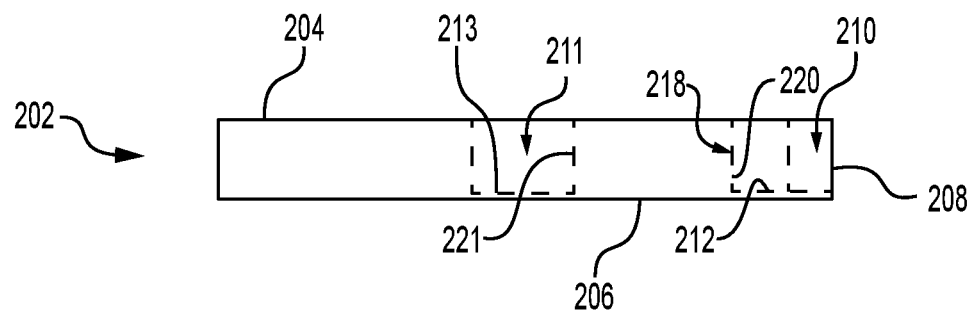
FIG. 2C is a side view of the panel shown in FIG. 2A.

Edge-formed recess 210 is, in the embodiment depicted in FIGS. 2A-C, shown being configured into an end face 214 of the lower edge 208 such that it has a consistent depth. More specifically, recess 210 comprises a floor 212 that is made to be substantially coplanar with the substantially planar upper panel surface 204. From top view FIG. 2B, it can be seen that the recess 210 has short parallel opposing side walls 214 and 216, and terminates internally with a rounded end 218 which presents internally a semi-cylindrical end wall 220 (see FIG. 2C).

The intermediately formed recess 211 has a generally cylindrical configuration, as can be seen in FIGS. 2A-C. More specifically, recess 211 is configured to have a floor 213 that is substantially parallel with upper surface 204, and has an internal cylindrical wall 221. Recess 211 will be used to receive a known threaded fastener device as will be discussed hereinafter.

FIGS. 3A-E depict a concealed fastener-administering insert 300 especially configured to be installed at a panel edge in an embodiment. The insert 300 and recess 110 have been configured such that the insert provides, and the recess allows for the same three-dimensional volume. The insert, in embodiments, is of a two-part construction including a body 302 and a snap-on enclosing bottom 304. In embodiments, the body 302 and enclosing snap-on enclosing bottom 304 are each laterally symmetrical, as can be seen in the different perspectives of FIGS. 3A and 3B.

At the top of body 302 is a flat upper plate 306 includes a fastener opening 307 which will be used to receive therethrough a fastener (e.g., bolt) as discussed hereinafter. The overall insert configuration results in the upper surface of upper plate 306 being substantially consonant, e.g., substantially coplanar with the surface 104 of the panel after insert installation and curing. In embodiments, opening 307 is substantially cross shaped (see FIG. 3C), and includes: (i) a head accommodating area 309, (ii) a shaft-accommodating area 311, as well as (iii) a driver accommodating area 313 (e.g., in embodiments a screwdriver is used to drive the bolt or screw into a receptacle shown later).

Other structural components of body 302 include a flat back wall 308, elongated opposed vertical side walls 310 and 312, and a curved and then truncated front wall portion 314 together define an inner space 316. The surface 308, after the insert is installed, will be substantially consonant with, e.g., coplanar with, the panel edge face 108 since the insert and recess have each been configured to match (e.g., in length, form fit, etc.). The front wall 356 of the front portion 314 includes a tab 315 with a downwardly-ramped surface. Inner space 316 can be enclosed from below when the enclosing bottom 304 is snapped on to provide a floor for an inner chamber 317 (see FIG. 3E). Back wall 308 includes an aperture 321 (see FIGS. 3B and 3E) which will be used to pass the threaded shaft of a fastener through as will be discussed hereinafter.

Figure 3A:
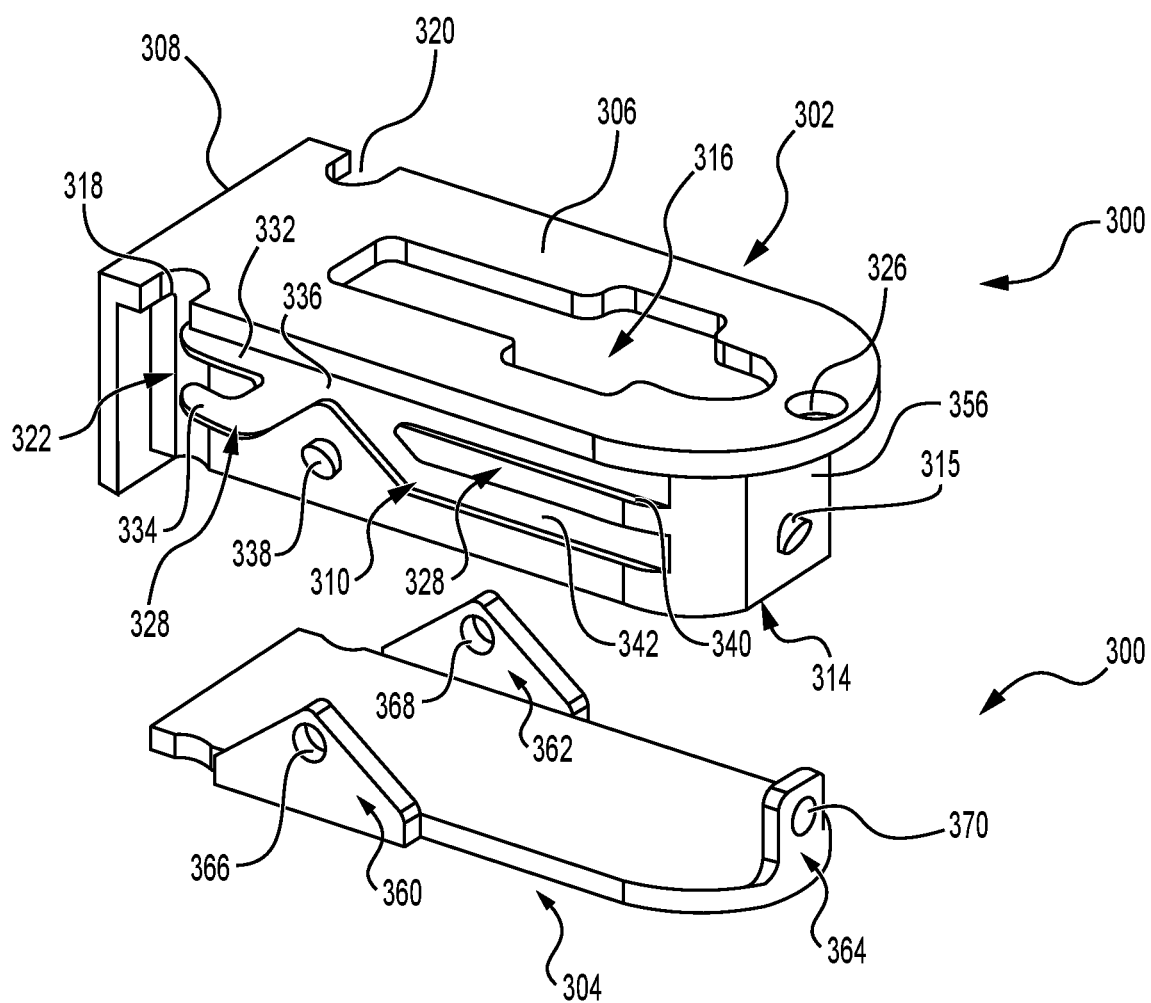
FIG. 3A is an angled perspective view of an insert used with the disclosed embodiments from slightly above.
Figure 3B:
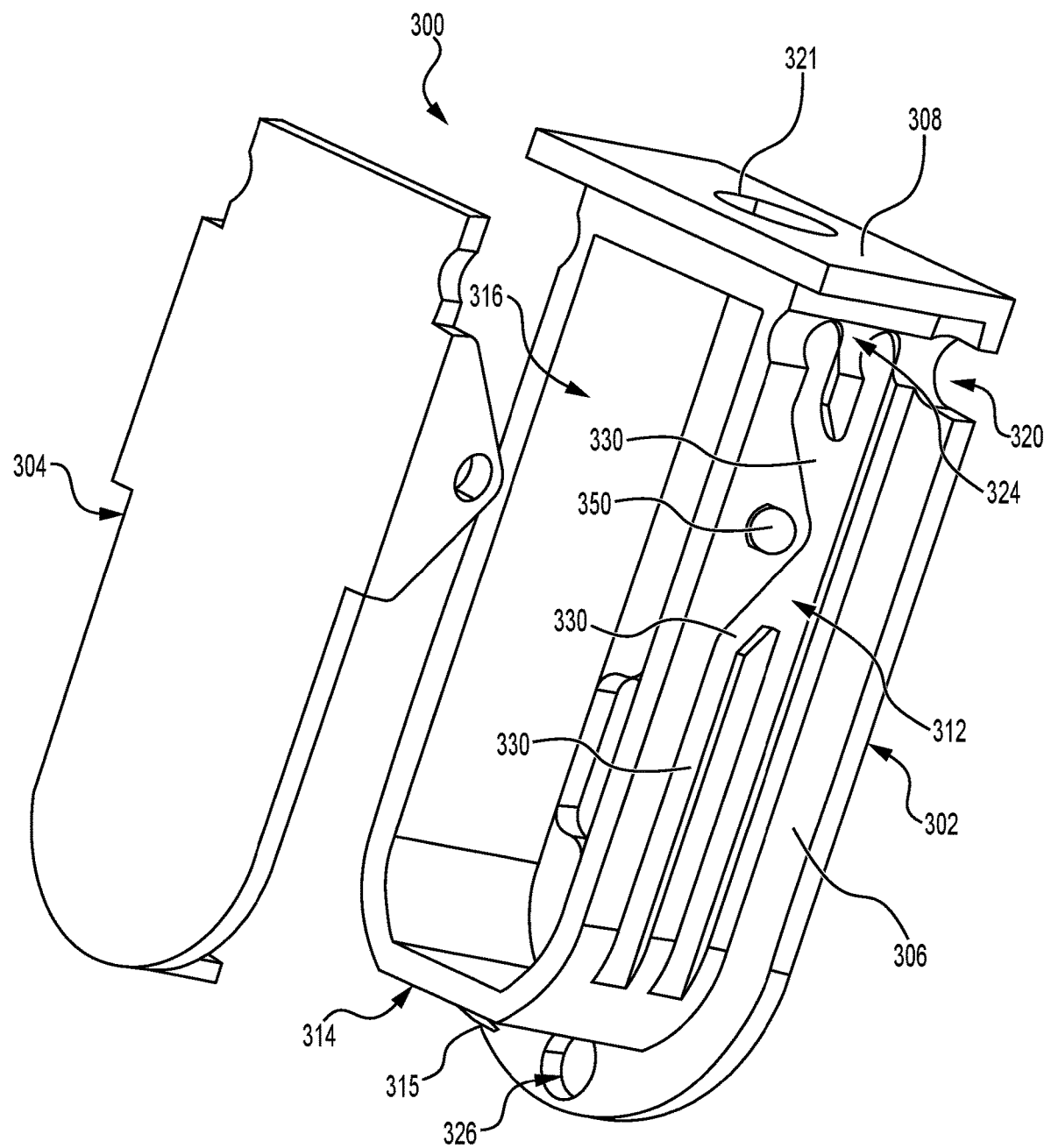
FIG. 3B is an angled perspective view of the insert shown in FIG. 3A from slightly above.
Figure 3C:
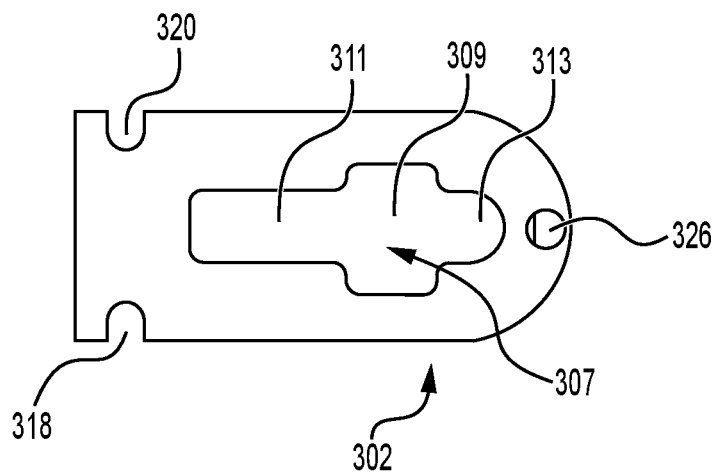
FIG. 3C is a top view of the insert shown in FIG. 3A.
Figure 3D:
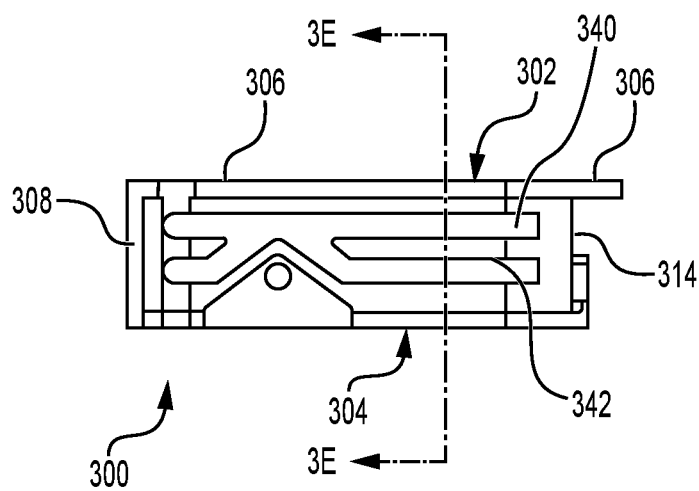
FIG. 3D is a side view of the insert shown in FIG. 3A.
Figure 3E:
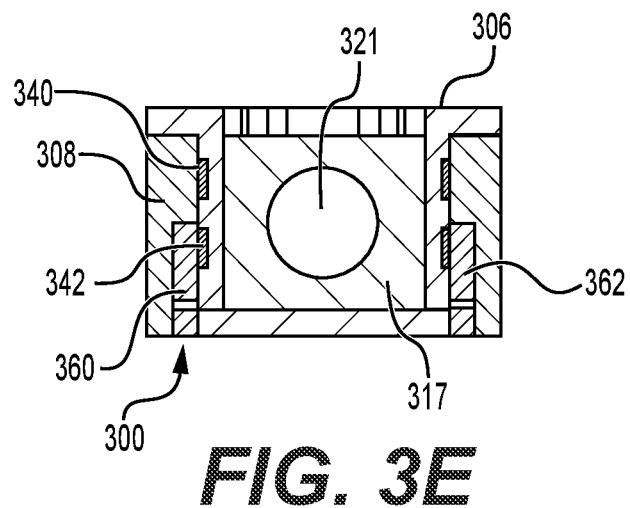
FIG. 3E is a cross sectional view taken from section 3E-3E taken from FIG. 3D.
Figure 4A:
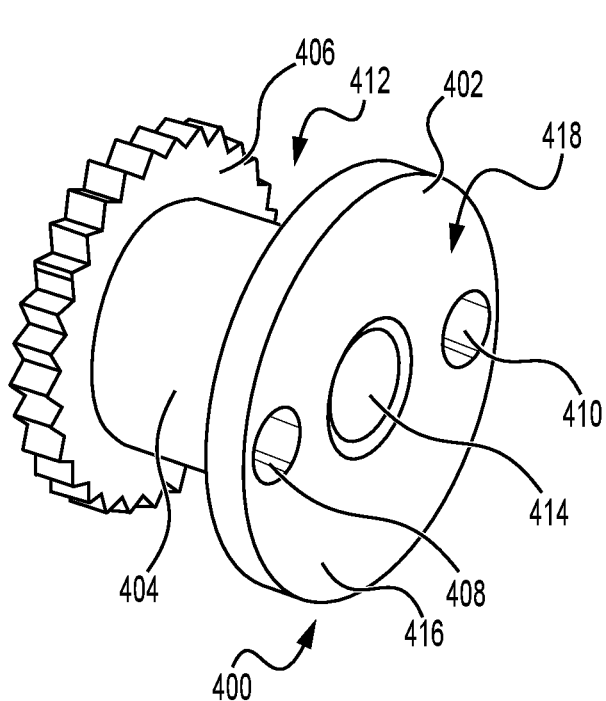
FIG. 4A is a perspective view shown of a conventional insert optionally used with the overall system embodiments disclosed herein.
Figure 4B:
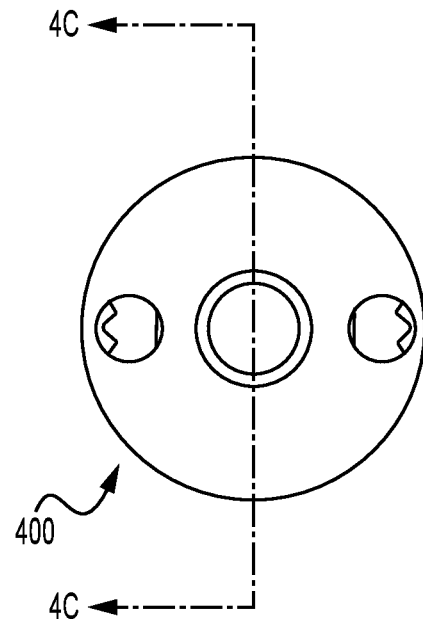
FIG. 4B is a top view of the insert disclosed in FIG. 4A.
Figure 4C:
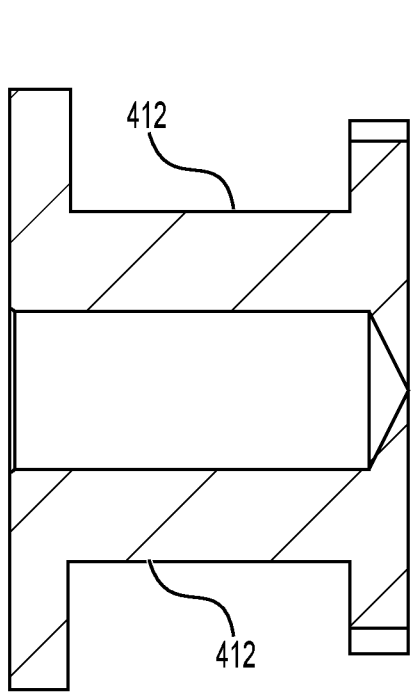
FIG. 4C is a cross sectional view taken from section 4C-4C taken from FIG. 4B.
Figure 4D:
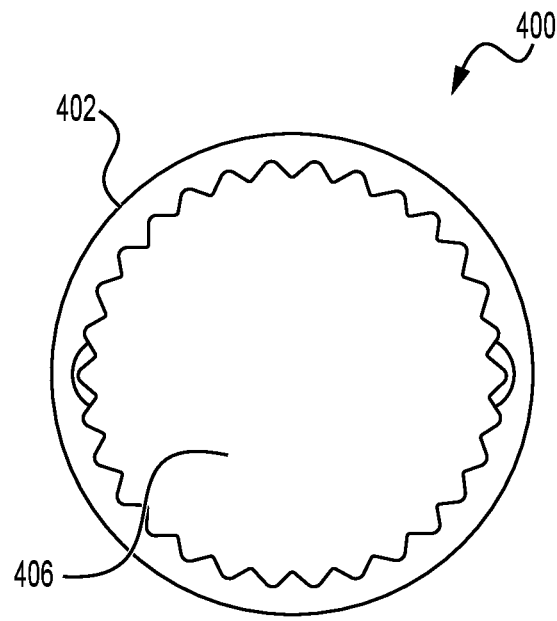
FIG. 4D is a bottom view of the insert shown in FIG. 4A.

Body 302 includes two rearward epoxy-receiving notch apertures 318 and 320, each leading down into respective downwardly-extending-cylindrical epoxy shafts 322 and 324 (see FIGS. 3A and 3B). A third epoxy-receiving aperture 326 is defined down through a forward portion of the upper plate 306. Each of apertures 318, 320, and 326 will be used to receive epoxy which will be used to secure the insert 300 into a structure as will be discussed hereinafter.

Enclosing bottom 304 has a substantially flat body 358 and three raised vertical flanges 360, 362, 364, each including an aperture (apertures 366, 368, 370) configured to receive respective ramped tabs 338, 340, and 315, respectively. The downward ramping of each of tabs 338, 340, and 315 causes each of vertical flanges 360, 362, and 364 to flex outwardly and then the apertures 366, 368, and 370 receive each tab. Once the ramped portion of each tab reaches each aperture, and thus, the flanges spring in to accept the tab in the apertures, the outwardly extending tops of each tab will retain the tabs in the apertures. This locks each tab (tabs 338, 340, and 315) in place inside each respective aperture (apertures 366, 368, and 370) and resists against detachment of the enclosing bottom 304 from the body 302. Thus, once the enclosing bottom 304 is thus installed, the internals of the insert will be sealed off against the upflow of resin therein.

In embodiments, the resin used for injection will comprise a two component epoxy adhesive. The two components consist of a resin and a hardener. The resin and hardener can both be simultaneously mixed and introduced using an epoxy cartridge gun (e.g., pneumatically driven or not) with a static mixing nozzle attached to mix the two components. There are numerous kinds of dispensers that could be used, e.g., manual, pneumatic, automated. An aircraft sealant gun can also be used. Once mixed, the two components harden due to chemical reaction. In embodiments, the epoxy introduced might comprise ATR-525A/B or Magnolia 65-4 B/A. But those skilled in the art will recognize that numerous other epoxies or other fluid adhesives could be used.

When epoxy received into notch apertures 318 and 320 drops down into shafts 322 and 324, it will then circulate forward around and along the sides 310 and 312 of the insert body 302 in and along the epoxy channel circuits 328 and 330 which are defined into each of side walls 310 and 312, respectively.

As can be seen in the first side circuit 328 (shown in FIG. 3A), the epoxy is first compelled into short upper and lower branches 332 and 334, then moves forward to reach a junction 336 (which is raised to be above a snap-in tab 338), and then is again spread apart by two forwardly-extending relatively long branches 340 and 342. Where the panel is formed with a honeycomb core, the internal voids in the panel allow for space the enables the resin to flow completely around the insert, thus, the flow is not contained entirely within the channels. Instead, the resin flows completely around the insert to encapsulate it. Referring now to FIG. 3B, it can be seen that the circuit 330 defined into the opposite side wall 312 similarly includes an arrangement where the epoxy moves from the shaft 324 into upper and lower branches 344 and 346, then moves forward to reach a junction 348 (which is raised to be above a snap-in tab 350), and then is again spread apart by two forwardly-extending long branches 352 and 354. Epoxy received into aperture 326 will fill a space existing between a forward face 356 and surrounding structures. Again here, the flow will not be completely contained in the channel networks because of the honeycomb internals, and the resin will ultimately encapsulate the insert.

FIGS. 4A-D show a fastener-receiving insert 400 used conventionally. This prior art insert is substantially cylindrical and includes a cylindrical upper flange top 402, a cylindrical post 404, and a serrated disc 406 at the insertion end. Insert 400 also includes two epoxy apertures 408 and 410. These are used to receive epoxy into a cylindrical space 412 defined between the inner surfaces of the top plate 402 and serrated portion 406 and the post 404. Threads of a fastener will engage with reciprocating threads included in an internally threaded coaxial bore area 414 inside the insert 400. Insert 400, although not itself novel, can be combined with the novel inserts 300 and 500 in novel ways.

FIGS. 5A-F disclose a fastener-receiving insert 500 utilized to connect at a panel edge. The insert 500 includes a body 502 including a longitudinal bore 504 made therethrough. Bore 504 is sized to receive and secure (by force fit, adhesive, or some other means) an internally-threaded cylinder 506 including threads for receiving a fastener. More specifically (referring to FIGS. 5A and 5E together), the cylinder 506 includes an inwardly tapered profile at an insertion end 507 of the device. End 507 is configured to mate with and butt against a receiving radially inwardly extending tapered lip portion 511 formed inside bore 504 inside body 502. The threaded bore 504 formed inside the cylinder 506 is enclosed and also tapered at the end where a fastener might engage depending on depth of penetration. The cylinder 506 can be force fit into bore 504, and/or adhesive can be applied to the outer surface 510 of the cylinder to secure the two together.

Body 502 includes a wall 512 (shown as vertical in FIG. 5A), and a substantially flat bottom 514. Wall 512 includes an outwardly-extending flange portions including side flange areas 516 and 518, and an arched top flange area 520. Flat bottom 514 also presents outwardly extending flange portions 522 and 524 that continue from the front wall 512 to the back end 526 of the body 502.

Figure 5A:
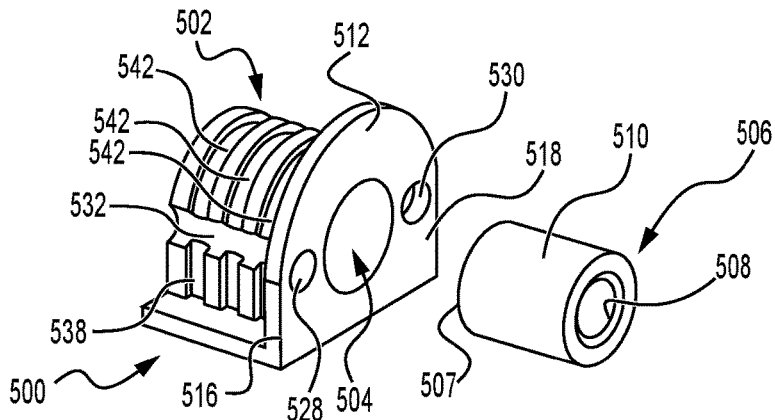
FIG. 5A is an exploded perspective view depicting an insert taken at an angle from slightly above.
Figure 5B:
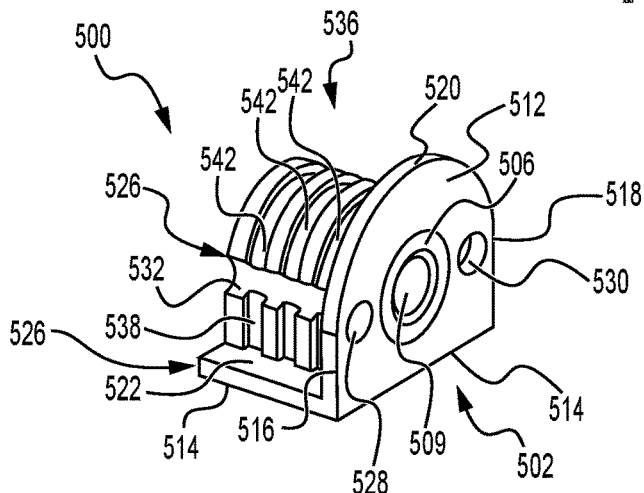
FIG. 5B is view depicting the insert of FIG. 5A shown in assembled form and taken from the same perspective revealed in FIG. 5A.
Figure 5C:
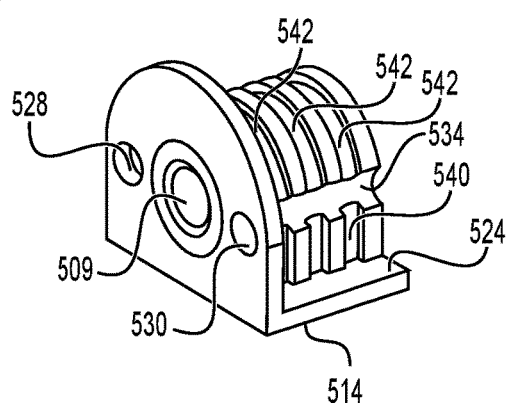
FIG. 5C is a view of the insert of FIG. 5B shown from a different perspective.
Figure 5D:
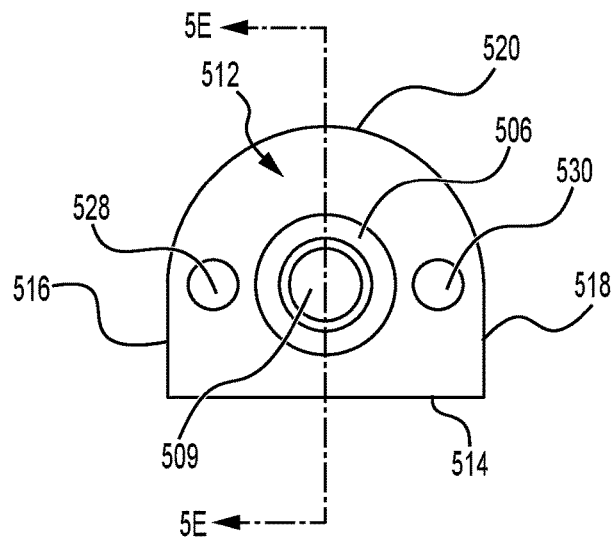
FIG. 5D is a front view of the insert shown in FIG. 5B.
Figure 5E:
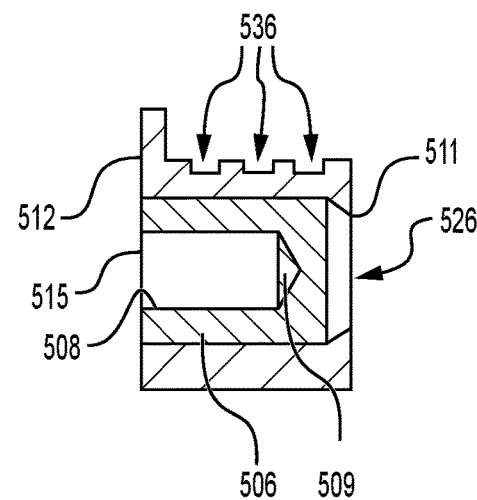
FIG. 5E is a cross sectional view taken at section 5E-5E taken in FIG. 5D.
Figure 5F:
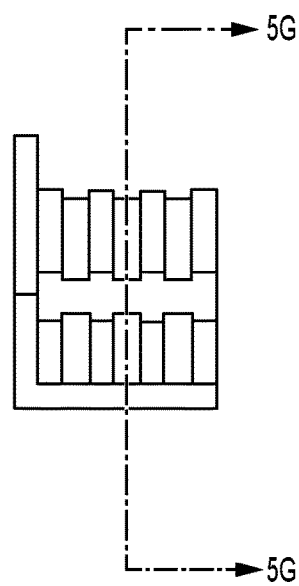
FIG. 5F is a side view of the insert shown in FIG. 5B.
Figure 5G:
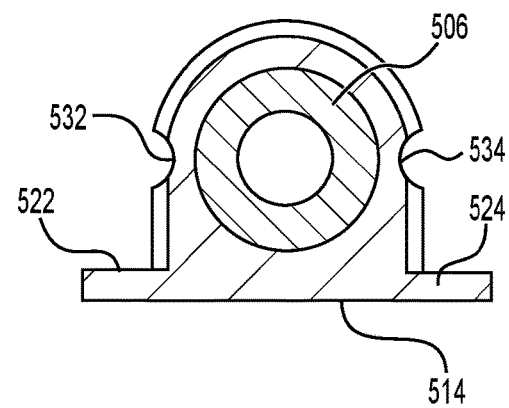
FIG. 5G is a cross sectional taken at section 5G-5G taken from FIG. 5F.
Figure 5H:
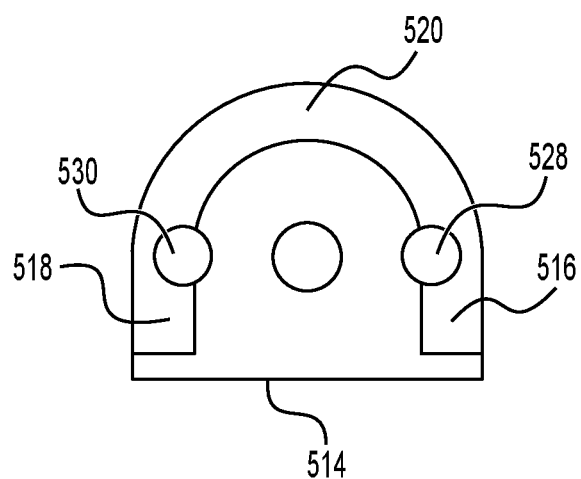
FIG. 5H is a rear view of the insert shown in FIG. 5B.

Apertures 528 and 530 made through wall 512 (shown as vertical in FIGS. 5A-G, but would be horizontal when positioned for this step) are used to introduce epoxy through shafts 532 and 534, respectively as shown in FIGS. 5B, 5C, and 5G. The shafts 532 and 534 (now oriented vertically within the insert 500) each open up into cross-channel network 536 defined into the outside surface of the body 502 that does not extend out as far as the flange portions of the wall 512, or as far as the flanges 522, 524. The cross-channel network includes lateral cross sections 538 and 540 on each side of the body 502. Each channel segment matches up with corresponding channel segments on an arched set of cross sections 542 that go over the top of the body 502.

Figure 6A:
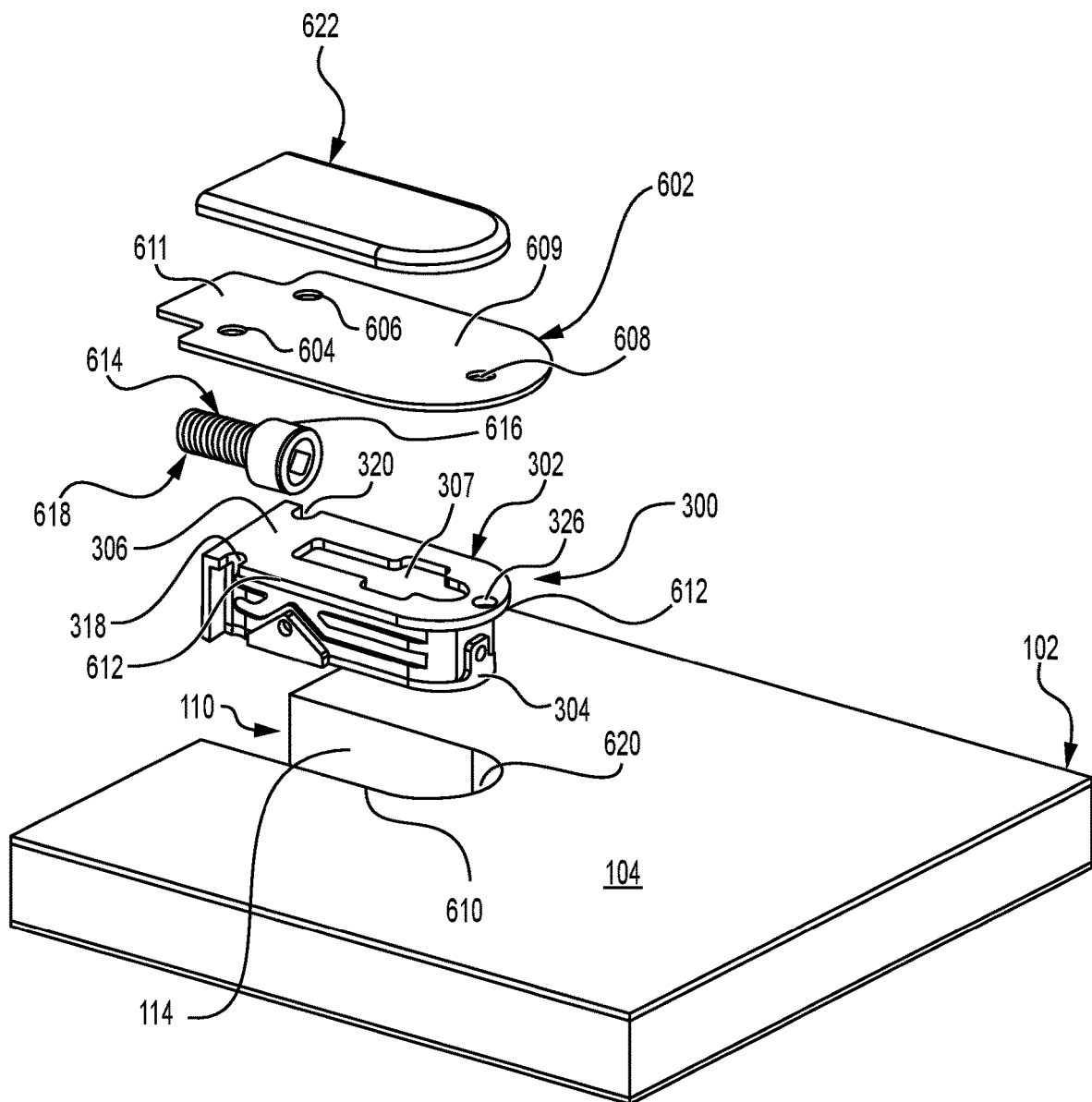
FIG. 6A is an exploded perspective view showing the insert of FIGS. 3A-E oriented above the panel of FIGS. 1A-C.

FIG. 6A depicts an exploded illustration helpful in understanding the process of installing fastener accommodating insert 300. Before beginning, it is presumed that the enclosing bottom 304 has already been locked onto the body 302 by snapping each of tabs 338, 340, and 315 into reciprocating apertures 366, 368, and 370 resulting in a connected insert 300 as can be seen in FIG. 6A.

Initially, panel 102 should be oriented such that surface 104 is facing up (as shown) and supported by laying it on a surface, or securing it in some fashion. Then, optional installation member 602 will be adhered to the upper surface of flat upper plate 306 of the insert body 302 such that rear holes 604 and 606 as well as front hole 608 made through member 602 are aligned with the epoxy-receiving apertures 318, 320, and 326 of the insert. The installation member may be configured to have a body portion 609 and a lifting tab 611. The body portion 609 will have adhesive applied below it, and the lifting tab will remain adhesive free so that it can be easily separated from the insert later to start a peel off process. In embodiments, the adhesive is a Pressure Sensitive Adhesive (PSA) adhesive capable of sticking and unsticking from the insert. As can be seen in FIG. 6A, the installation member 602 when adhered such that it extends beyond the area of the upper surfaces of the insert top wall 306, to the extent that the outer margins of the installation member 602 will adhere atop the upper panel surfaces 610 on the panel proximate the edges of the recess 110. Thus, the member 602 spans over the space between the insert wall 306 to the upper panel surfaces 610. The holes 604, 606, and 608 in the member 602 expose the epoxy-receiving apertures 318, 320, and 326. At the same time, member 602 caps off the entire opening 307 as well as any gap existing between the outer edges 612 of the insert top wall 306 (see FIG. 6A).

Once member 602 is adhered atop the insert top wall 306 (insert 102 is now in the fitted recess 110) and spanning to the surfaces of the panel 102 (and the insert assembly 300 is thus placed for further treatment), epoxy can be introduced into each of the apertures 318, 320, and 326. Injection, in the disclosed embodiment, can be done one aperture at a time. Alternatively, however, injection could be made into multiple holes simultaneously depending on the injection equipment utilized.

Upon being introduced into either of apertures 318 or 320, the force from an injection in combination with gravitational force will causes the epoxy to travel down the relevant shaft (shaft 322 for aperture 318, shaft 324 for aperture 320), and then spread throughout any existing space created between the exposed outside surfaces of the body 302 and enclosing bottom 304. Where the panel 102 is a honeycomb composite material, the voids in the honeycomb structures will enable flow that ultimately encapsulates the insert 300. The reason for the multiple injection sites is to help push the air out of the recess 110 which has been machined out of the panel so you do not create backpressure and thus allow the epoxy to flow adequately. In terms of longitudinal movement along the assembly 300, the flow of epoxy is aided by channel circuits 328 and 330 which are defined into each of side walls 310 and 312, respectively. Thus, introduction into aperture 318 will cause the epoxy to travel through shaft 322, then through all the branches of circuit 328. Although the flow is directed along the circuits, the circuits do not fully contain the flowing epoxy. Thus, there is flow-around also created by voids existing due to the honeycomb internals. Thus, injection into aperture 318 will, when the available space is full of epoxy, begin to appear in, or begin to back out of that same aperture 318. A symmetrical process is followed regarding epoxy introduced into aperture 320. More specifically regarding flow, epoxy introduced into first side circuit 328 (shown in FIG. 3A) via aperture 318 and shaft 322 will first drawn into short upper and lower branches 332 and 334, arch upward in junction 336 to avoid the snap in tab, and then is again spread apart into the long branches 340 and 342. Although the channel circuits 328 and 330 are helpful with flow control around the insert 302, they will also help with adhesion between the insert 302 and the surrounding honeycomb and other structures. Once all are filled, again, epoxy will back out of the aperture 318 and filling can be stopped. The same process is followed regarding the filling of circuit 330 in side wall 312 (via aperture 320 into shaft 324) then into upper and lower branches 344 and 346. The epoxy then moves up and over the tab 350 in junction 348 and is then spread apart into the forwardly-extending long branches 352 and 354 until full (which is detected by back flow out of the aperture 320).

Introduction of epoxy into front aperture 326 will be deposited into a front chamber defined by (i) the exposed surfaces of the front wall 356 of the truncated end 314, (ii) the exposed surfaces of flange 364, (iii) the exposed surfaces on the inside of the arch 120 of the recess 110, as well as fully encapsulating the flow-around created by the voids in the surrounding honeycomb structures. Again here, backing out of epoxy from aperture 326 will be an indication that the space has been filled, and administration should be stopped.

The existence of multiple injection sites at apertures 318, 320, and 326 is helpful for a number of reasons including aiding in pushing air out of the insert filled cutout area 110 so you do not create backpressure and allow the epoxy to flow. E.g., insertion into aperture 318 will allow air to escape out of the other holes 320 and 326. The same is true for each hole independently injected into. More specifically, each of the apertures 318, 320, and 326 provides lead into separate areas that are, to an extent, fluidly open to one another. For example, aperture 318 is associated with a first chamber space defined by shaft 322 and channel network 328; aperture 320 is associated with a second chamber space defined by shaft 324 and channel network 330; and aperture 326 is associated with a third chamber space (the front chamber) defined by (i) the exposed surfaces of the front wall 356 of the truncated end 314, (ii) the exposed surfaces of flange 364, and (iii) the exposed surfaces on the inside of the arch 120 of the recess 110. But although each aperture is primarily open to a particular chamber, all are fluidly in communication due to resin flow-around. Thus, the entire insert will be encapsulated, and any single chamber arrangement of the three can be filled to accomplish that objective.

Once the insert has been encapsulated due to the resin introduced into each of the three apertures 318, 320, and 326, the insert assembly 300 will then be cured inside the recess 110 at the panel edge due to the chemical reaction created by combining the two materials (resin and hardener).

After the epoxy is cured, the installation member 602 can be pealed or lifted off revealing the fastener-accommodating opening 307, which has been configured to accept therethrough a fastener, e.g., a device like fastener 614 shown in FIG. 6A, which might include a head 616 and a shaft 618 as shown. For other sorts of fasteners, opening 307 (see FIG. 3C) might be configured to allow passage of those different fasteners. As touched on above, the configurations of the insert assembly 300, in embodiments, result in the back wall 308 of the insert to be substantially consonant with, e.g., substantially coplanar with the panel edge 108, and the top surfaces of the insert (plate 306) to be substantially consonant with panel surface 104. This makes the existence of the insert not interfere with the continuous appearance of the panel.

Item 622 in FIG. 6A is an optional cover 622 seen in detail in FIGS. 6B-6E. As can be seen, the cover 622 has upper exposed surfaces 624, and two toothed prongs 626 which are able to be snapped inside the edges at area 311 in opening 307 after the assembly of two panels (discussed hereinafter). It will normally be desirable, however, to wait to install the optional cover until the other panel 202 has been connected to it.

Before panels 102 and 202 can be connected, panel 202 must also be equipped with fastener thread receiving inserts 400 and 500 in the disclosed embodiment. In the example shown in the exploded view shown in FIG. 7, this includes the installation of conventional cylindrical insert 400 into cylindrical recess 211, and the installation of novel insert 500 into recess 210. Although shown in FIG. 7 as being upright, it should be noted that to start the insert installation process, panel 202 would be laid flat (e.g., substantially horizontal) on some surface such that the epoxy is subjected to a gravitational force in the right orientation.

Figure 7:
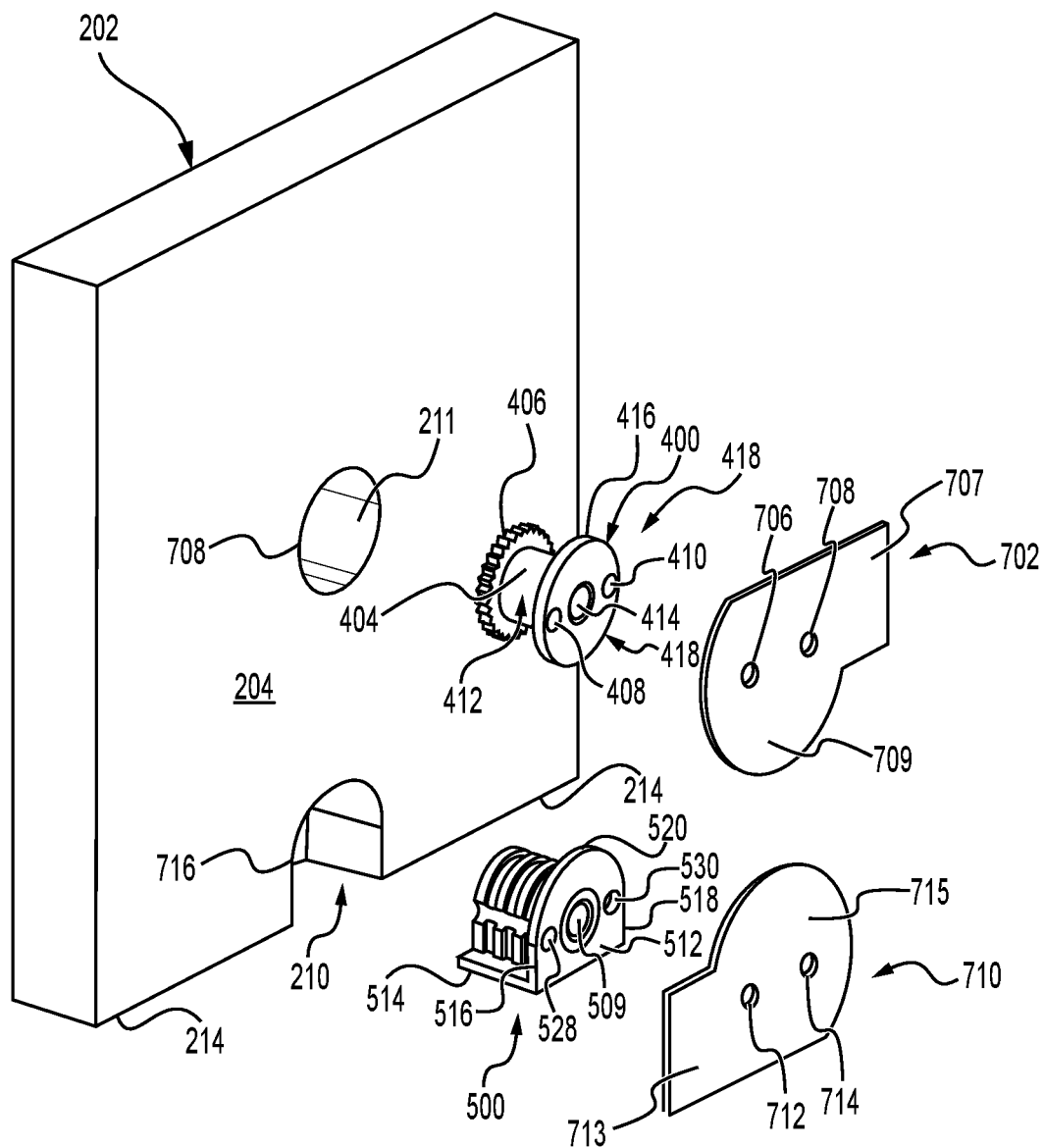
FIG. 7 shows a perspective exploded view wherein the inserts of FIGS. 4A-D and FIGS. 5A-H are oriented for installation.

The securement of insert 400 (details can be seen in FIG. 4A), can involve the use of an installation member 702 (see FIG. 7). In embodiments, member will have a lifting tab 707 and an adhesive undercoated body portion 709. Installation member 702 will be adhered to surface 416 on the outermost disk 418 of the insert 400 such that holes epoxy-receiving apertures 408 and 410 are aligned with holes 704 and 706. Again here, the adhesive used to temporarily adhere the member 702 to the insert 418 could be a PSA or some other kind of adhesive. The margins of member 702 will extend beyond the area of the upper surface of the plate 416 to the extent that they adhere to the upper panel surfaces 708 (see FIG. 7) proximate the edges of the recess 211 when the insert 400 is inserted into the hole 211.

Thus, when secured in the hole 211 and exposed, the epoxy-receiving apertures 408 and 410 are able to receive epoxy. Again here, the type of epoxy used might comprise the same two-part adhesive discussed above, or some other adhesive. Gravity and force from the injection means then causes the epoxy to enter a common space between the outside surfaces of the cylindrical post 404, the underside of the plate 418, and the serrated inner plate 406. When this space is completely filled, epoxy will seep out of the aperture opposite the one being filled (e.g., filling aperture 408 will cause epoxy to exude aperture 410 since the two apertures share the same chamber are and thus are in fluid communication) and filling can be stopped.

Once filled, insert assembly 400 will cure over time to harden and be permanently secured inside the recess 211 in the middle of the panel 202. Once cured in place, the outer surface 402 of the insert 400 will be substantially consonant with the panel surface 204, e.g., flush, and the threads in the insert will be ready to receive the reciprocating threads of a fastener (screw or bolt, e.g.). By using the terms "substantially consonant" it should not be interpreted as requiring a perfectly flush or mutually parallel relationship. The terms instead should be construed as meaning that the two surfaces look at least create a somewhat continuous appearance between the insert and the panel surface.

Installation of insert 500 into edge-located recess 210 can also involve the use of an installation member 710. Member 710 can be configured to have a lifting tab 713 and an adhesive undercoated body portion 715. To use the member 710, it will be adhered to the outer surface of vertical planar wall 512 of the insert body 502 such that insert holes 528 and 530 are aligned with apertures 712 and 714 made through the installation member 710. Again here, the adhesive coating the underside of member 710 could be a PSA or some other adhesive. As can be seen in FIG. 7, the installation member 710 extends beyond the area of the upper surface of the plate 204 such that the outer margins of the installation member 710 adhere to the upper plate surfaces 716 proximate the edges of the recess 210. The hole alignment exposes the epoxy-receiving apertures 528 and 530 while at the same time capping off the threaded center chamber of the cylinder 506 as well as any gap existing between the outer edges of the insert wall 512 (see FIGS. 5B, 5C, and 7).

Once member 710 is adhered onto the outside surface 512 of the insert 500, insert 500 can be inserted into the recess 210 as shown in FIG. 7, and then epoxy can be introduced into each of the apertures 528 and 530 using some sort of epoxy delivering means, e.g., an epoxy cartridge gun with a static mixing nozzle or some other arrangement like those discussed already above. In embodiments, the epoxy introduced might be like those already discussed above.

Once introduced into each of apertures 528 and 530, gravity and/or any force from an injection means will cause the epoxy to travel down shafts 532 and 534, and then spread throughout any existing space created between the exposed outside surfaces of the body 502. In terms of movement after entry into the shafts 532 and 534, the epoxy will then flow into the cross-channel arrangement 536 defined into the outside surface of the body 502. More specifically, the epoxy will flow into lateral cross sections 538 and 540 on each side of the body 502, as well as into the arched set of cross sections 542 that go over the top of the body 502. While the resin is flowing in the channels, it is also flowing around all the outside surfaces of the insert due to the voids existing around it in the recess 210. The vertical and horizontal walls 512 and 514 of the insert 500 prevent seepage out of epoxy from anywhere other than the apertures 528 and 530. Thus, a stopping point will be detected when epoxy begins to back out of either aperture (of apertures 528 and 530). Additionally, the existence of a second aperture enables air to escape so that the open spaces around the insert can be completely filled to accomplish encapsulation.

The insert 500 will then be cured into the recess 210 at the panel edge due to the chemical reaction of the resin and hardener.

After each of the inserts 400 and 500 have been cured into recesses 211 and 210 either together or separately, the installation members 702 and 710 can be peeled off using the lifting tabs 707 and 713 revealing the threaded receptacles 414 and 509, which are each designed to receive threads from a fastener (e.g., bolt 614 and the like). As touched on above, the configurations of the insert assembly 500, in embodiments, result in the wall 512 of the insert to be substantially consonant with, e.g., substantially flush or coplanar with the panel face 204, and the lower wall 514 of the insert 500 will be substantially coplanar with panel edge 214. This makes the existence of the insert not interfere with the look-and-feel continuity along the edge of the panel.

Figure 8A:
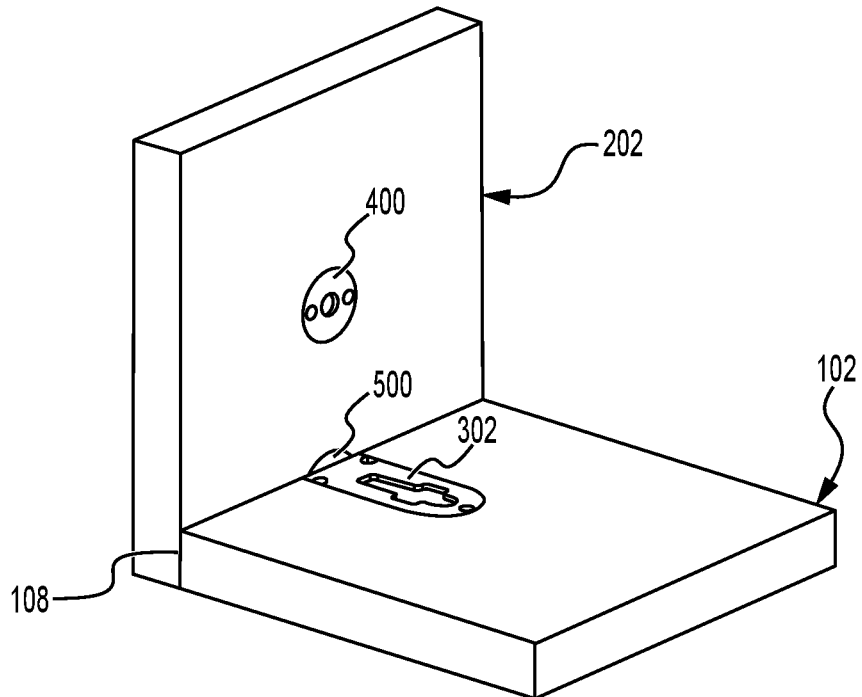
FIG. 8A discloses a panel attached to another panel in an edge-mount arrangement according to disclosed methods.
Figure 8B:
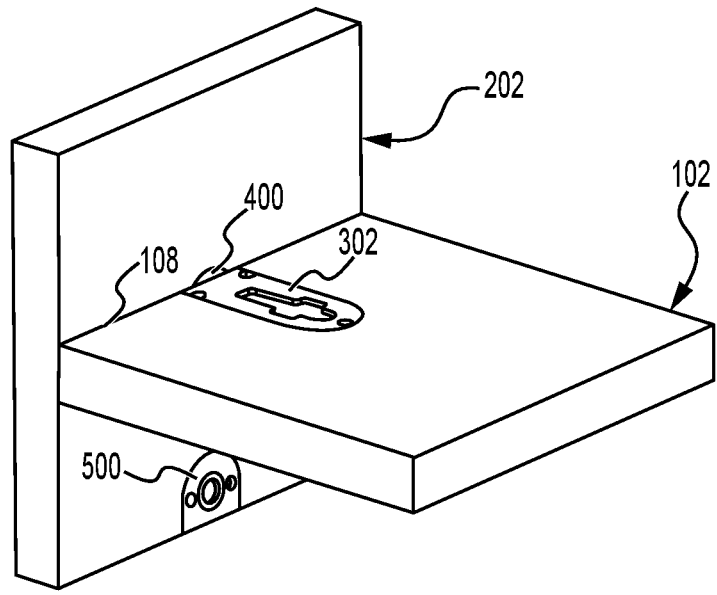
FIG. 8B discloses a panel attached to another panel in a center-mount arrangement according to disclosed methods.
Figure 8C:
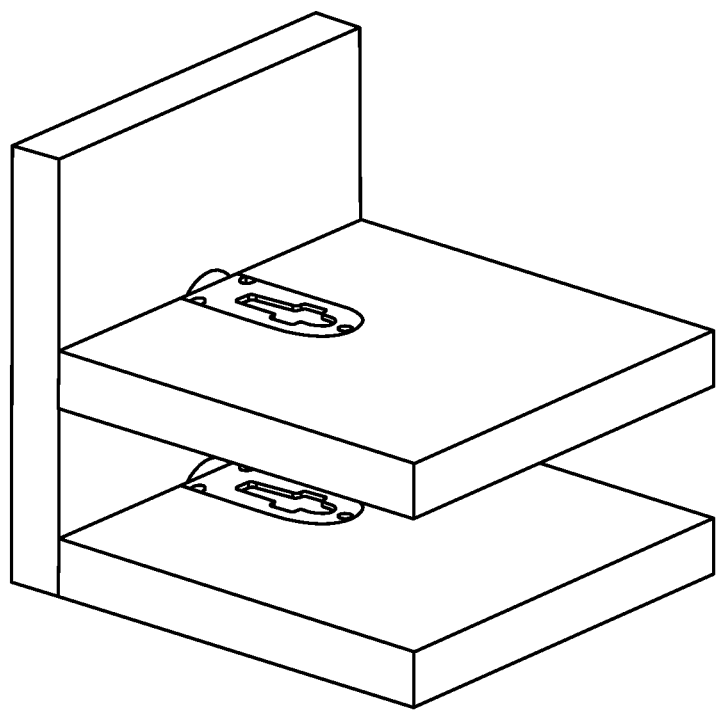
FIG. 8C discloses both the edge and center-mount arrangements being made.

Once both panels 102 and 202 have been prepared with inserts 302, 400 and 500 installed, it is possible to join the panels together. For example, as shown in FIG. 8A, panel 102 has been installed such that edge 108 abuts the lower outside surface of vertical panel 202. The two panels will be fixed to one another as follows. First, a fastener (e.g., fastener 614) is inserted into the fastener-accommodating opening 307 (see FIGS. 3C and 6A) such that the head is able to drop through the head accommodating area 309, and the threaded end is able to drop through the shaft-accommodating area 311. Next, the threaded end 618 of the fastener is pushed through the hole 321 in the back wall 308 of the insert 302 and then engaged into the reciprocating threads existing in threaded area 509 in insert 500. The fastener (e.g., bolt 614) can be a hexagonal-head type, and receive a ball-end hexagonal type screwdriver, key, or other sort of device to impart rotation into the fastener. In a similar manner, as shown in FIG. 8B, the panel 102 can be fixed to a middle area (at the location of insert 400) by instead installing the fastener into the threaded receptacle of insert 400. FIG. 8C shows an arrangement where both kinds of fastening combinations can be used to create articles where multiple panels are affixed at edges and intermediate locations.

One skilled in the art will recognize that these arrangements could be used in numerous ways to accomplish different panel fastening objectives. For example, multiple fastening arrangements involving fastener-accommodating inserts (e.g., like insert 302) along a single edge of a first panel to correspond with reciprocating threaded inserts (e.g., like insert 500) installed into a second panel edge. Similarly, an insert relationship could be used to fasten a first panel edge together with one or more intermediate second panel locations using face-incorporated threaded inserts (like insert 400).

Referring back to the optional cover 622 shown in FIG. 6A-E, after panels have been connected (as shown in FIGS. 8A-C), these devices can be used to optionally cover the fastener receiving opening 307 as well as all other evidence of the insert 302. More specifically, the outwardly toothed prongs 626 for each cover desired can be snapped inside the edges of the opening 307 at area 311. Referring to FIG. 8C, this could be done for each of the fastener accommodating inserts (e.g., ones like insert 302) if desired. Although FIGS. 8A-C reveal assembled structures, it should be recognized that they are only partial depictions and that numerous applications could be made of the structure-fastening technologies disclosed herein.

The overall system involving creating recesses in the panel edges, pressing in like-sized inserts, introducing epoxy, and providing a fastener into one of the two inserts for receipt into the other is especially adaptable to nested-based manufacturing technologies. This is true because all the recesses can be machined using known automated machinery, and the epoxy introducing, and fastening steps can also be easily automated making overall process exceptionally robust, accurate, and efficient.

Many different arrangements of the various components depicted, as well as components not shown, are possible without departing from the spirit and scope of what is claimed herein. Embodiments have been described with the intent to be illustrative rather than restrictive. Alternative embodiments will become apparent to those skilled in the art that do not depart from what is disclosed. A skilled artisan may develop alternative means of implementing the aforementioned improvements without departing from what is claimed.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A method for fastening an edge of a first panel to an edge of a second panel, the system comprising:
   orienting the edge of the first panel at an angle to, and along the edge of the second panel;
   configuring a first insert to fit into and be secured inside a first recess defined into the edge of the first panel, the first insert configured with an upper plate configured to be substantially consonant with a first surface on the first panel and a fastener opening extending through the upper plate, the fastener opening configured to receive a fastener, the first insert further configured with a back wall being perpendicular to the upper plate, the back wall configured to be substantially consonant with a corresponding surface of the edge of the first panel, the first insert having an aperture extending through the back wall, the aperture configured to allow the fastener to extend therethrough after being received by the fastener opening; and
   configuring a second insert to fit into and be secured inside a second recess defined into the edge of the second panel and to have a first face with a fastener receptacle defined therethrough, the fastener receptacle having a center axis that is substantially perpendicular to the second panel and the first face being substantially consonant with a first surface on the second panel, and further configuring the second insert with a second face being perpendicular to the first face and being substantially consonant with a corresponding surface of the edge of the second panel;
   wherein the fastener receptacle is configured to receive a portion of the fastener after the fastener extends through the aperture of the first insert.

2. The method of claim 1, comprising:
   securing the first and second inserts into the first and second recesses using epoxy.

3. The method of claim 2, comprising:
   forming one or more epoxy apertures into the upper plate a top portion of the first insert to receive epoxy into a space defined around a plurality of outside surfaces of the first insert to encapsulate a base of the first insert.

4. The method of claim 2, comprising:
   forming one or more epoxy apertures into the first faced of the second insert to receive epoxy into a space defined around a plurality of outside surfaces of the second insert to encapsulate a base of the second insert.

5. The method of claim 1 comprising:
   creating the fastener opening as an elongated aperture through the upper plate of the first insert, the elongated aperture having a widened portion configured to allow passage of a fastener head into an inside area of the first insert before said fastener is extended through the aperture extending through the back wall for installation.

6. The system of claim 1 wherein at least one of the first and second structures is a composite panel.

7. A system for connecting a first structure to a second structure, the system comprising:
   an insert configured to be received and secured into a recess formed into an edge of the first structure;
   the insert including a body portion having a top, a right side, and a left side, each of the top, the right side, and the left side extending from a front end to a back end such that the body portion is substantially uniform in a height and a width between the front end and the back end, and the back end defining a back plane;
   the insert including a front wall abutting the front end of the body portion, the front wall forming a first face configured to be substantially consonant with a first surface on the first structure;
   the insert including a bottom wall extending from the front wall and terminating at the back plane, the bottom wall forming a second face being in a plane that is substantially perpendicular relative to the first face, the second face being substantially consonant with a corresponding surface of an edge of the first structure;
   the bottom wall including a right side outwardly extending flange portion and a left side outwardly extending flange portion, the right side outwardly extending flange portion extending outwardly past the right side of the body portion and the left side outwardly extending flange portion extending outwardly past the left side of the body portion, the right side outwardly extending flange portion and the left side outwardly extending flange portion extend from the front wall to the back plane; and
   a fastener receiving area defined into and through the first face of the insert and extending into the body portion, the fastener receiving area configured to receive a fastener used to secure the second structure to the first structure.

8. The system of claim 7 wherein the insert is configured to fit snugly in a three-dimensional volume defined by a plurality of inside surfaces of the recess, the plurality of inside surfaces including a floor that is configured to align substantially parallel to the first face of the insert, the insert configured to fit such that the back end of the body portion abuts the floor.

9. The system of claim 7 wherein the fastener receiving area includes a bore sized to receive and secure an internal cylinder, the cylinder configured receive the fastener.

10. The system of claim 9 wherein the internal cylinder includes threads configured to mate with corresponding threads on the fastener.

11. The system of claim 7 wherein the front wall extends outwardly from the insert to form an arched flange that is configured to engage areas inside the recess near the first surface of the first structure.

12. The system of claim 11 wherein the right side outwardly extending flange portion and the left side outwardly extending flange portion are configured to engage internal surfaces of the recess near the edge of the first structure.

13. The system of claim 12 wherein the arched flange and the left side and right side outwardly extending flange portions define an internal space between the body portion of the insert and a plurality of internal surfaces of the recess when the insert is installed.

14. The system of claim 13 wherein one or more apertures exist in the front wall of the insert, each of the one or more apertures allowing epoxy to be introduced into one or more corresponding epoxy-conducting shafts, the epoxy-conducting shafts delivering epoxy to be distributed inside the internal space defined when the insert is installed.

15. The system of claim 14 wherein the body portion presents a plurality of cross channels arching over the body portion, the cross channels being established by crosswise grooves receiving epoxy from each of the one or more epoxy-conducting shafts.

16. The system of claim 7, wherein the insert is configured to secure within the recess such that only the front wall and the bottom wall are visible once inserted.

17. A system for fastening an edge of a first panel to an edge of a second panel, the system comprising:

a first insert shaped to fit into and be secured inside a first recess defined into the edge of the first panel, the first insert having:
an upper plate configured to be substantially consonant with a first surface on the first panel, the upper plate having a fastener opening extending therethrough, the fastener opening configured to receive a fastener; and
a back wall being perpendicular to the upper plate, the back wall configured to be substantially consonant with a corresponding surface of the edge of the first panel, the back wall having an aperture extending therethrough, the aperture sized to allow the passage of a shaft of a fastener, but deny passage of a head of the fastener therethrough, the aperture configured to allow the shaft to extend therethrough after being received by the fastener opening;
a second insert shaped to fit into and be secured inside a second recess defined into the edge of the second panel, the second insert having:
a first face with a fastener-receiving receptacle extending therethrough, the fastener-receiving receptacle having a center axis that is substantially perpendicular to the second panel, the first face being substantially consonant with a first surface on the second panel; and
a second face being perpendicular to the first face and being substantially consonant with a corresponding surface of the edge of the second panel;
wherein the fastener receiving receptacle is configured to receive the shaft of the fastener after the shaft extends through the aperture of the first insert.

18. The system of claim 17 wherein the first and second inserts are configured to receive epoxy to secure the first and second inserts into the first and second recesses, respectively.

19. The system of claim 18 wherein one or more epoxy apertures are formed into each of the first and second inserts to introduce epoxy into a confined space created inside each of the first and second inserts.

20. The system of claim 17 wherein the fastener-receiving receptacle installed into the second insert comprises an internally threaded cylinder.

* * * * *